UNITED STATES PATENT OFFICE.

GEORGE H. BENJAMIN, OF NEW YORK, N. Y.

PROCESS OF MANUFACTURING DIETHYL-ETHER.

SPECIFICATION forming part of Letters Patent No. 662,585, dated November 27, 1900.

Application filed January 3, 1899. Serial No. 700,906. (No specimens.)

*To all whom it may concern:*

Be it known that I, GEORGE H. BENJAMIN, a citizen of the United States, residing at New York city, county and State of New York, have invented a new and useful Process of Manufacturing Diethyl-Ether, of which the following is a specification.

My invention relates to a process of manufacturing diethyl-ether, ($C_2H_5-O-C_2H_5$); and it consists, essentially, in subjecting hydrogen-ethyl sulfate ($C_2H_5HSO_4$) to the action of heat and at the same time introducing into the hydrogen-ethyl sulfate the required quantity of ethylene ($C_2H_4$) and hydrogen (H) and oxygen, (O.)

The object of my invention is to decrease the cost of producing pure diethyl-ether by bringing about a chemical combination of the elements necessary to form diethyl-ether without employing alcohol or producing alcohol in the process.

To carry my invention into effect, I proceed as follows: To a definite quantity of hydrogen-ethyl sulfate ($C_2H_5HSO_4$) contained in a suitable vessel I add the required quantity of ethylene ($C_2H_4$) and the required quantity of hydrogen (H) and oxygen, (O.) The mixture is then heated sufficiently to effect distillation. The distilled ether in the form of gas may be condensed to a liquid form by any suitable condensing apparatus and the remaining sulfuric acid may be again used to form hydrogen-ethyl sulfate. The required quantity of the different elements may be readily calculated.

The reactions taking place in the process are indicated by the following formula:

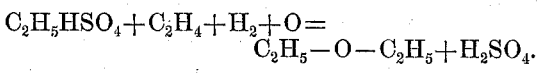

The ethylene to be introduced into the mixture may be obtained by any process known to chemists, but preferably that described in United States Letters Patent No. 608,652, dated August 9, 1898, and granted to Frederic R. Coudert, Jr., administrator of A. M. Villon, deceased.

The hydrogen and oxygen may be obtained by any process known to chemists, but preferably by electrolyzing water by passing a current of electricity through it, as by this means these elements are obtained in the required proportions, hydrogen ($H_2$) and oxygen, (O,) and in a state or condition in which they are more active than if obtained by chemical means.

In practice I consider it preferable to collect the gases generated at the respective poles and then discharge them separately into the mixture. I take this course in order to avoid the possibility of forming an explosive mixture in the vessel.

Instead of forming the hydrogen and oxygen external to the mixture I may add water to a mixture of hydrogen-ethyl sulfate and ethylene and then electrically decompose the water by passing an electric current through the mixture, in which case the hydrogen and oxygen will be set free in a nascent condition.

I do not wish to limit myself to any special apparatus for carrying out my improved process, and hence I have shown none. However, it will be within the knowledge of any chemist to arrange a suitable apparatus for carrying the described process into effect.

Having thus described my invention, I claim—

1. The herein-described process of manufacturing diethyl-ether, which consists in subjecting a mixture of hydrogen-ethyl sulfate, ethylene, and hydrogen and oxygen to the action of heat.

2. The herein-described process of manufacturing diethyl-ether, which consists in subjecting a mixture of hydrogen-ethyl sulfate, ethylene and water to the action of an electric current, whereby the water is decomposed into hydrogen and oxygen, and at the same time subjecting the mixture of hydrogen-ethyl sulfate, and hydrogen and oxygen so formed, to the action of heat.

In testimony whereof I affix my signature in the presence of two witnesses.

GEORGE H. BENJAMIN.

Witnesses:
J. E. PEARSON,
E. U. PLATT.